(12) United States Patent
Dubois et al.

(10) Patent No.: US 8,845,390 B2
(45) Date of Patent: Sep. 30, 2014

(54) PREDICTIVE CALCULATION METHOD FOR CALCULATING A SIMULATED SHAPE OF AN ENGAGEMENT RIDGE TO BE ARRANGED ON THE EDGE FACE OF AN OPHTHALMIC LENS OF A PAIR OF EYEGLASSES, AND A METHOD OF BEVELING

(75) Inventors: Frédéric Dubois, Charenton le Pont (FR); Eric Belloni, Charenton le Pont (FR); David Freson, Charenton le Pont (FR); Richard Kot, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 665 days.

(21) Appl. No.: 13/162,253

(22) Filed: Jun. 16, 2011

(65) Prior Publication Data

US 2012/0108144 A1    May 3, 2012

(30) Foreign Application Priority Data

Jun. 24, 2010    (FR) ..................................... 10 02646

(51) Int. Cl.
*B24B 47/22*    (2006.01)
*B24B 9/14*    (2006.01)
*G02C 1/00*    (2006.01)

(52) U.S. Cl.
CPC ............... *B24B 9/14* (2013.01); *B24B 47/225* (2013.01); *G02C 1/10* (2013.01)
USPC ................................................ 451/5; 451/43

(58) Field of Classification Search
CPC .......... B24B 49/00; B24B 9/144; B24B 9/14; B24B 47/225; B24B 47/22

USPC ........................ 451/5, 8, 9, 10, 43, 255, 256
See application file for complete search history.

(56) References Cited

U.S. PATENT DOCUMENTS 5,155,940 A * 10/1992 Suzuki ............................... 451/5
5,501,017 A *  3/1996 Suzuki ............................. 33/200
8,133,095 B2 *  3/2012 Lemaire et al. ................. 451/43

(Continued)

FOREIGN PATENT DOCUMENTS

FR    2 893 524 A1    5/2007
FR    2 912 335 A1    8/2008
FR    2 926 898 A1    7/2009

OTHER PUBLICATIONS

French Search Report, dated Nov. 2, 2010, from corresponding French application.

*Primary Examiner* — Robert Rose
(74) *Attorney, Agent, or Firm* — Young & Thompson

(57) ABSTRACT

A predictive calculation method for calculating the shape of a cross-section of an engagement ridge of an ophthalmic lens obtained by beveling the lens with a beveling grindwheel driven in accordance with an initial path setting. The method includes the following steps:
acquiring the initial path setting for the beveling grindwheel relative to the lens;
determining at least two approximations ($S_{ii}$, $S_{ij}$) of the shape of the cross-section under consideration of the engagement ridge, the approximations being deduced from the intersection between the beveling grindwheel and the ophthalmic lens when the beveling grindwheel is situated at two distinct positions of the initial path setting;
determining the intersection between these two approximations; and
deducing therefrom the shape ($S_i$) of the cross-section under consideration of the engagement ridge.

17 Claims, 4 Drawing Sheets

(56) References Cited

U.S. PATENT DOCUMENTS

| | | | |
|---|---|---|---|
| 8,460,056 B2* | 6/2013 | Haddadi et al. ................... | 451/5 |
| 2009/0093194 A1* | 4/2009 | Nauche ........................... | 451/43 |
| 2010/0009603 A1* | 1/2010 | Nauche ........................... | 451/43 |
| 2010/0312573 A1 | 12/2010 | Haddadi | |

* cited by examiner

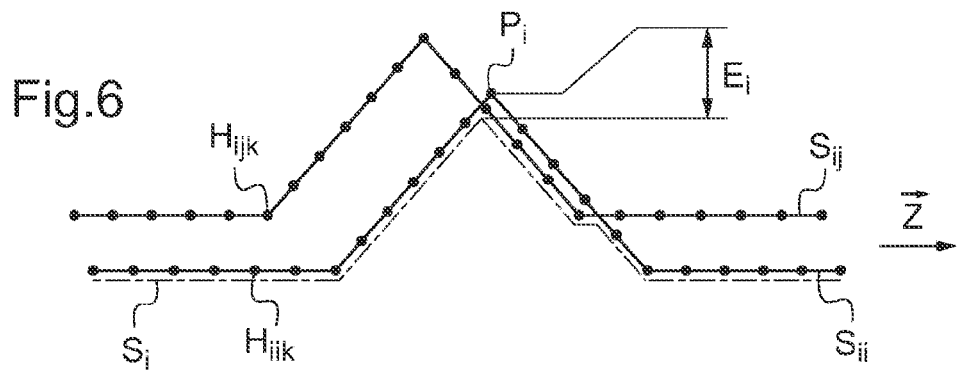
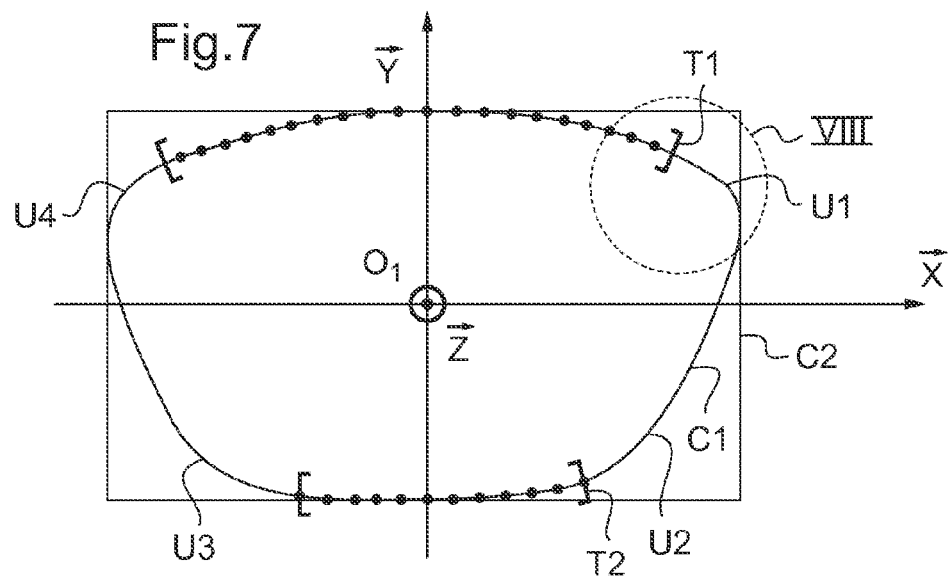
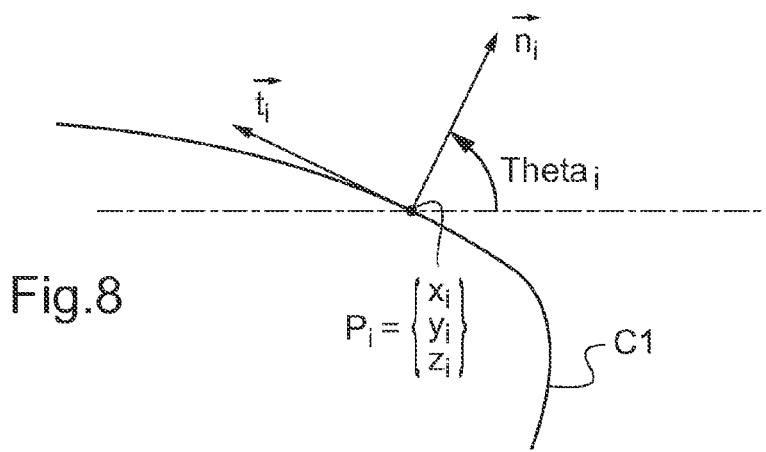

PREDICTIVE CALCULATION METHOD FOR CALCULATING A SIMULATED SHAPE OF AN ENGAGEMENT RIDGE TO BE ARRANGED ON THE EDGE FACE OF AN OPHTHALMIC LENS OF A PAIR OF EYEGLASSES, AND A METHOD OF BEVELING

TECHNICAL FIELD TO WHICH THE INVENTION RELATES

The present invention relates in general to mounting ophthalmic lenses on an eyeglass frame of a pair of eyesight correcting lenses.

The invention applies more particularly to ophthalmic lenses that are strongly cambered and/or that are designed to be shaped so as to have an outline that presents zones that are substantially rectilinear.

TECHNOLOGICAL BACKGROUND

A frame generally has two rims, each presenting an inside bezel forming a groove.

Shaping an ophthalmic lens for the purpose of mounting it in a corresponding rim of the selected eyeglass frame then consists in modifying the outline of the lens so that it matches the shape of the rim.

This shaping comprises two operations, namely edging to shape the periphery of the lens, and beveling to put an engagement ridge into place on the periphery of the lens for engaging in the bezel of the corresponding rim of the eyeglass frame.

The edging operation consists in eliminating the superfluous peripheral portion of the ophthalmic lens in question so as to bring its outline, which is usually initially circular, down to an outline of a shape that is close to the shape of the outline of the corresponding rim of the eyeglass frame.

The beveling operation consists in forming an engagement ridge, also known as a "bevel", along the edge face of the ophthalmic lens. This engagement ridge is for engaging in the bezel formed along the inside face of the corresponding rim of the eyeglass frame, in order to hold the ophthalmic lens rigidly in the rim.

Conventionally, these operations of edging and beveling are performed by a grinding appliance that is referred to as a grinder and that possesses means for blocking the lens and for driving it in rotation, together with an edging grindwheel and a beveling grindwheel mounted to rotate for the purpose of machining said lens. The beveling grindwheel generally presents a shape that is generally cylindrical, with a beveling groove formed halfway along serving to generate the bevel on the edge face of the lens.

At the end of the beveling operation, with certain lenses, in particular lenses that are strongly cambered and lenses that are edged to have an outline presenting a zone that is substantially rectilinear, a phenomenon is observed whereby the bevel becomes thinner. This bevel-thinning phenomenon degrades the quality and the accuracy with which the lens is mounted in its frame.

This phenomenon, referred to as "paring away" of the bevel, can be explained as follows. The beveling grindwheel presents a large radius. As a result, during the beveling operation, the arc of the beveling grindwheel that is engaged in the material of the lens is extensive. Consequently, when the beveling grindwheel is machining the edge face of the lens at a given cross-section of said lens, it also machines, in involuntarily manner, a portion of the edge face of the lens that is situated in front of said cross-section and another portion of the edge face of the lens that is situated behind said cross-section. A first interference is thus observed between the beveling grindwheel and the portion of the bevel that has already been made and a second interference is observed between the beveling grindwheel and the portion of the bevel that remains to be made. These interferences thus generate this phenomenon of the bevel being thinned.

In order to minimize this problem, a solution is put forward in document FR 2 893 524. That solution consists in modifying a conventional grinder that includes a beveling grinder disk mounted to rotate about a first axis, so as to provide said grinder disk with an additional degree of freedom in movement. The grinder disk is more precisely mounted to pivot about a second axis that is orthogonal to the first axis, thereby enabling it to be oriented in such a manner that it follows the curvature of the edge face of the lens so as to reduce the extent to which the bevel is pared away. Nevertheless, such a grinder is particularly expensive to fabricate.

OBJECT OF THE INVENTION

The object of the present invention consists rather in determining the extent to which the bevel might be pared away even before beginning to machine the ophthalmic lens.

To this end, the invention provides a predictive calculation method for calculating a simulated shape of at least a portion of at least one cross-section under consideration of an engagement ridge that is to be arranged on the edge face of an ophthalmic lens and that is to result from beveling the edge face of said ophthalmic lens by means of a beveling grindwheel rotating about an axis of rotation, with movement thereof relative to the ophthalmic lens being driven in application of an initial path setting, the method comprising the following steps:

a) obtaining at least a portion of said initial path setting making it possible to form at least a fraction of said engagement ridge;

b) determining a first approximation of the shape of at least a portion of said cross-section under consideration of the engagement ridge, the approximation being deduced from the intersection between the beveling grindwheel and the ophthalmic lens when the beveling grindwheel is situated in a first position of its initial path setting;

c) determining a second approximation of the shape of at least a portion of said cross-section under consideration of the engagement ridge, the approximation being deduced from the intersection between the beveling grindwheel and the ophthalmic lens when the beveling grindwheel is situated at a second position of its initial path setting, distinct from its first position;

d) determining the intersection between first and second approximations of the shape of said cross-section under consideration of the engagement ridge; and e) deducing from the intersection determined in step d), the simulated shape of said cross-section under consideration of the engagement ridge.

Thus, according to the invention, an estimate is made of the initial shape that the section under consideration of the engagement ridge of the ophthalmic lens will present after the ophthalmic lens has been shaped in application of the initial path setting, by determining the effect that the beveling grindwheel will have on said cross-section under consideration while it is machining another cross-section of the engagement ridge, adjacent to the cross-section under consideration.

By means of the invention, it is thus possible to predict in advance the shape that the engagement ridge will have after the ophthalmic lens has been shaped in application of the initial path setting. It is then possible to form an opinion concerning the quality with which the ophthalmic lens will be mounted in the corresponding rim of the eyeglass frame, even before beginning the operations of shaping the ophthalmic lens.

Other characteristics of the predictive calculation method of the invention that are advantageous and non-limiting are as follows:

said first position of the beveling grindwheel corresponds to the position in which its axis of rotation extends in the plane of said cross-section under consideration;

additional steps are provided consisting in determining additional approximations of the shape of said cross-section under consideration of the engagement ridge, said approximations being deduced from the intersection between the beveling grindwheel and the ophthalmic lens when the beveling grindwheel is situated in other positions of its initial path setting that are distinct from said first and second positions, and in step d), in determining the intersections between all of the various approximations of the shape of said cross-section under consideration of the engagement ridge;

the additional approximations of the shape of said cross-section under consideration of the engagement ridge are made for positions of the beveling grindwheel that are situated exclusively on the initial path setting on either side of the first position within a simulation portion presenting a determined simulation length; and the simulation length is less than 20 millimeters along a curvilinear abscissa.

The present invention also provides, more generally, a predictive calculation method for calculating a simulated shape of at least a portion of an engagement ridge to be arranged on the edge face of an ophthalmic lens, the method comprising a plurality of repetitions of the above predictive calculation method for calculating simulated shapes of various cross-sections under consideration of said at least one portion of the engagement ridge.

Other characteristics of this predictive calculation method that are advantageous and non-limiting are as follows:

said first positions of the beveling grindwheel associated with the various cross-sections under consideration are grouped together exclusively on predetermined segments of interest of the initial path setting;

the segments of interest are those on which the initial path setting of the beveling grindwheel satisfies a relationship that is a function of the radius of curvature of the initial path setting and of the diameter of the beveling grindwheel; and the segments of interest are spaced apart in pairs along a curvilinear abscissa by a length that is greater than 20 millimeters.

The present invention also provides, more generally, a method of beveling an ophthalmic lens to arrange an engagement ridge on the edge face of said ophthalmic lens.

In a first implementation of this beveling method:

proceeding with the predictive calculation of the simulated shape of at least a portion of the engagement ridge in accordance with the above method;

correcting said initial path setting for the beveling grindwheel as a function of the simulated shape of the engagement ridge so as to obtain a corrected path setting; and driving the movement of the axis of the beveling grindwheel relative to the ophthalmic lens while following said corrected path setting.

Advantageously, in order to obtain the corrected path setting, the simulated shape of the engagement ridge is compared with the initial path setting, and as a function of the result of this comparison, the initial path setting is corrected.

In a variant, in order to obtain the corrected path setting, the method consists in acquiring a geometric model of a bezel of an eyeglass frame in which the ophthalmic lens is to be mounted after beveling; for at least one cross-section of the engagement ridge, calculating a diameter increase about an axis of the ophthalmic lens for application to the simulated shape of the engagement ridge so that said simulated shape as corrected in this way is substantially tangential to the bezel of the eyeglass frame; and as a function of said diameter increase, correcting the initial path setting.

In a second implementation of this beveling method:

performing the predictive calculation of the simulated shape of at least a portion of the engagement ridge in accordance with the above predictive calculation method; and refusing or accepting beveling of the ophthalmic lens with the beveling grindwheel and its initial path setting as a function of the simulated shape of the engagement ridge.

Advantageously, for at least one cross-section of the engagement ridge, the method consists in determining a difference or a ratio between the area of the first approximation of the shape of the cross-section under consideration and the area of the simulated shape of the cross-section under consideration; comparing said difference or said ratio with a threshold value; and refusing or accepting beveling of the ophthalmic lens with the beveling grindwheel and its initial path setting as a function of the result of said comparison.

Preferably, after refusing beveling using the beveling grindwheel and its initial path setting, the method proceeds with beveling of the ophthalmic lens with another tool of smaller diameter or with another machining appliance providing the beveling grindwheel with at least one additional degree of freedom in movement.

DETAILED DESCRIPTION OF AN EMBODIMENT

The following description with reference to the accompanying drawings, given by way of non-limiting example makes it clear what the invention consists in and how it can be reduced to practice.

In the accompanying drawings:

FIG. 6 is a diagrammatic view showing the final shape of a cross-section of the engagement ridge, as determined from the intersection between two approximations of the shape of said engagement ridge deduced from the shape and the position of the beveling grindwheel relative to the ophthalmic lens while machining two different cross-sections of the engagement ridge;

FIG. 7 is a face view of the outline to which the ophthalmic lens is to be shaped;

FIG. 8 is a detailed view of zone VII of FIG. 7; and

OPHTHALMIC LENS

Figure 1:
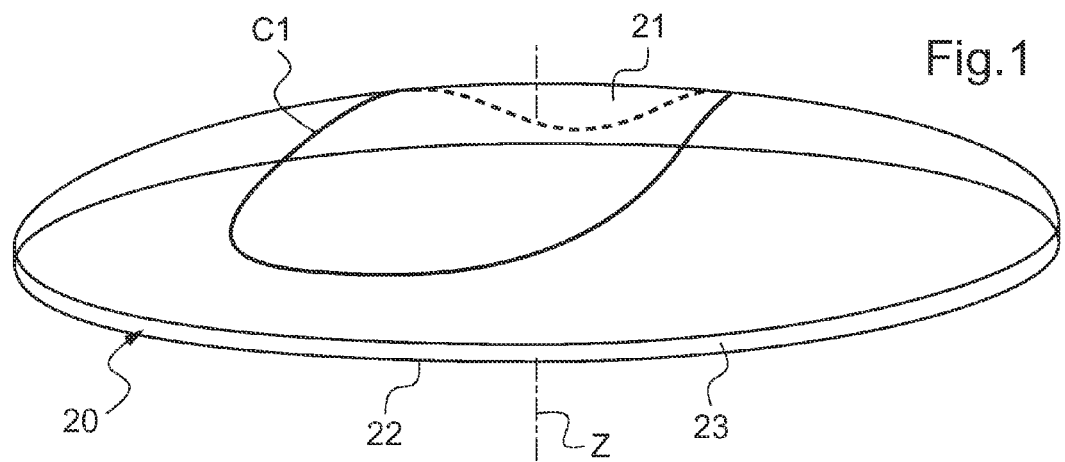
FIG. 1 is a diagrammatic perspective of an ophthalmic lens to be beveled for mounting in a rim of an eyeglass frame.

FIG. 1 shows an ophthalmic lens 20 in the form in which it is presented to an optician on being delivered by a lens manufacturer.

The ophthalmic lens 20 has two optical faces, a front face 21 and a rear face 22, and it also has an edge face 23. As shown in FIG. 1, the edge face 23 of the lens presents an initial outline that is circular. Nevertheless, the ophthalmic lens 20 is to be shaped so as to have an outline C1 of determined shape in order to be capable of being engaged in the corresponding rim of the eyeglass frame selected by the future wearer of the eyeglasses.

The outline C1, of a shape that is determined in this way as a function of the shape of the rim of the selected eyeglass frame, is positioned on the lens during a centering operation that consists in determining the position that each lens is to occupy in the frame so as to be suitably centered facing the pupil of the wearer's eye so that it performs correctly the optical function for which it has been assigned. This centering operation is well known to the person skilled in the art and is not described in detail herein.

FIG. 7 shows a projection of the outline C1 onto a plane. In this figure, there can also be seen the boxing rectangle C2 of the outline C1, i.e. the rectangle in which the outline C1 is inscribed and having two of its sides parallel to the horizontal axis of the ophthalmic lens 20.

FIG. 7 also shows a rectangular coordinate system, referred to as the orthonormed system ($O_1$, X, Y, Z) having the center $O_1$ of the boxing rectangle as its origin, having an axis parallel to the horizontal axis of the ophthalmic lens as its X axis, and having the axis that passes through the center $O_1$ of the boxing rectangle and that is normal to the front optical face 21 of the ophthalmic lens 20 as its Z axis. This Z axis is referred to herein as the central axis Z of the ophthalmic lens 20.

As described in greater detail, the shaping of the ophthalmic lens 20 to have the outline C1 comprises two operations, comprising an edging operation for eliminating the superfluous peripheral surface of the ophthalmic lens 20 in order to bring its outline to a shape close to that of outline C1, and a beveling operation for forming a ridge along the edge face 23 of the ophthalmic lens 20.

Figure 2:
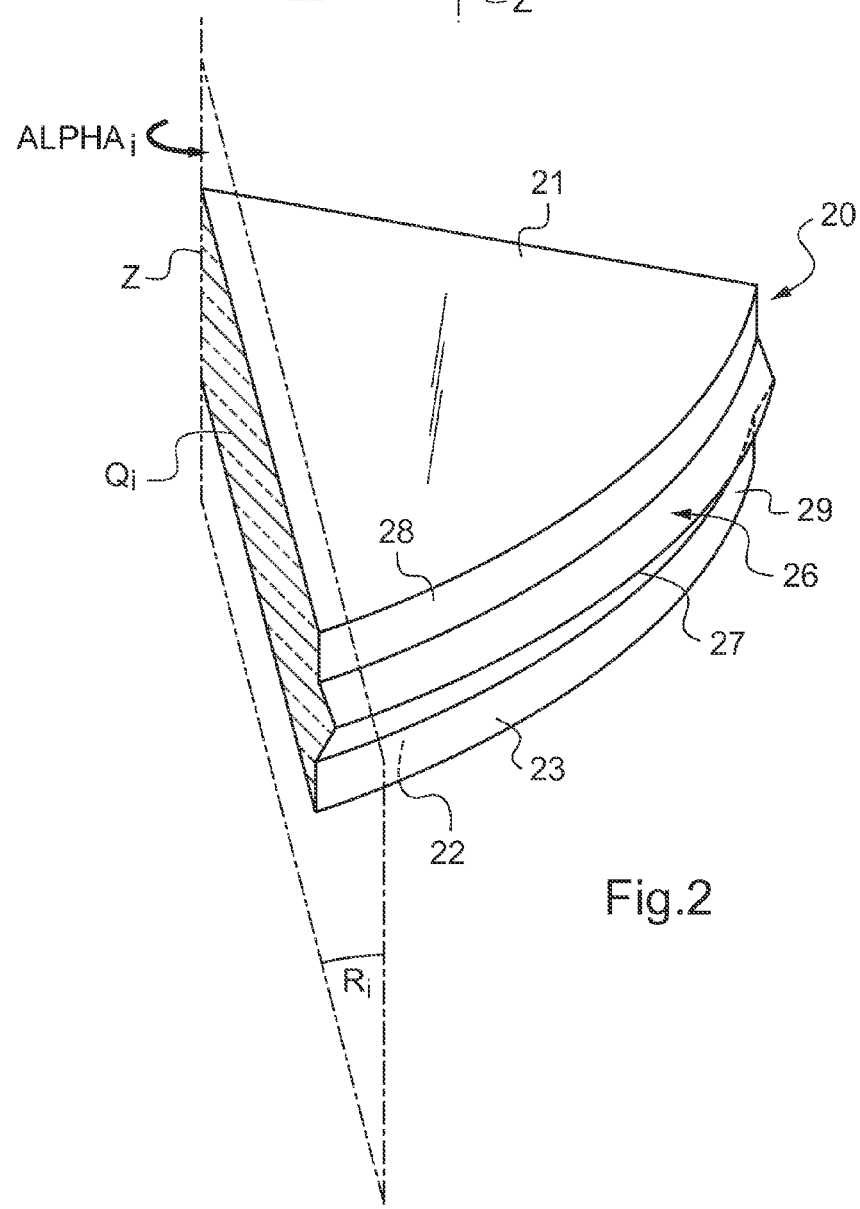
FIG. 2 is a diagrammatic perspective view of an angular sector of the FIG. 1 ophthalmic lens after it has been beveled.

As shown in FIG. 2, once shaped, the ophthalmic lens 20 thus presents an engagement ridge 26 (or "bevel") lying between front and rear margins 28 and 29 (or "bevel flats"). In this example the engagement ridge 26 presents a V-shaped section with a top edge 27 that runs around the edge face 23 of the lens following the outline C1, and on either side of said top edge 27, front and rear flanks.

The engagement ridge is thus designed to be engaged in a bezel formed along the inside face of the corresponding rim of the eyeglass frame in order to hold the ophthalmic lens rigidly in the rim.

The cross-section $Q_i$ of the ophthalmic lens 20 is defined herein as the intersection between said lens and a half-plane $R_1$ that is defined by the central axis Z of the lens and that presents a determined orientation $ALPHA_i$ around the central axis Z.

Each cross-section $Q_i$ of the ophthalmic lens 20 thus defines a particular profile for the edge face 23 of the ophthalmic lens. As shown in FIG. 2, in this example the profile presents two parallel segments corresponding to the traces of the front and rear margins 28 and 29 of the engagement ridge 26 in the half-plane $R_i$, and two V-shaped segments corresponding to the traces of the front and rear flanks of the engagement ridge 26 in said half-plane $R_i$.

Shaper Device

Figure 3:
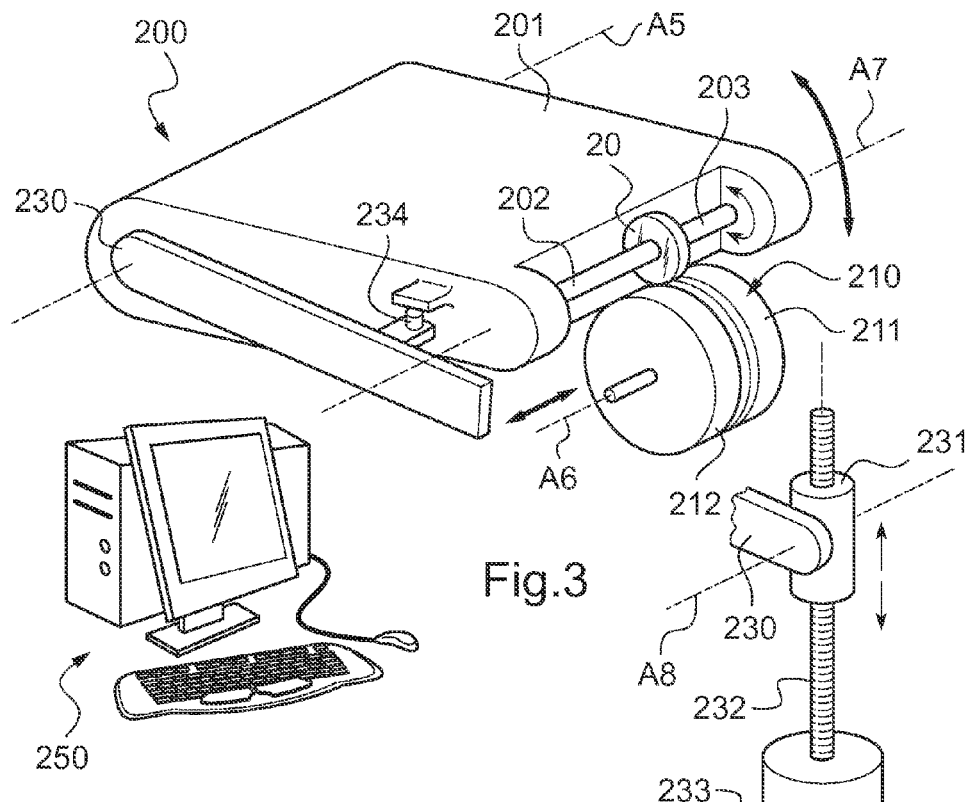
FIG. 3 is a diagrammatic perspective view of a grinder including a beveling grindwheel adapted to form an engagement ridge on the edge face of the FIG. 1 ophthalmic lens.

In order to shape this ophthalmic lens 20, use is made of a shaper appliance as shown diagrammatically in FIG. 3.

In a first embodiment as shown in FIG. 3 the shaper appliance is constituted, in known manner, by an automatic grinder 200 commonly said to be numerically-controlled. Specifically, the grinder comprises:

a rocker 201 that is mounted to pivot freely about a reference axis A5, in practice a horizontal axis, on a structure that is not shown, which rocker supports the ophthalmic lens 20 that is to be machined; and a set of grindwheels 210 that is mounted to rotate about a grinder axis A6 parallel to the reference axis A5 and that is appropriately driven in rotation by a motor that is not shown.

The rocker 201 is fitted with a lens support that, in this example, comprises two shafts 202 and 203 for clamping onto the ophthalmic lens 20 that is to be shaped and for driving it in rotation. These two shafts 202 and 203 are in alignment with each other on a blocking axis A7 parallel to the reference axis A5. Each of the shafts 202 and 203 possesses a free end that faces the free end of the other shaft and that is fitted with a chuck for blocking the ophthalmic lens 20. A first one 202 of the two shafts is stationary in translation along the blocking axis A7. The other one 203 of the two shafts is, on the contrary, movable in translation along the blocking axis A7 in order to clamp the ophthalmic lens 20 in axial compression between the two blocking chucks. These two shafts are arranged to block the ophthalmic lens 20 in such a manner that the central axis Z of the lens coincides with the blocking axis A7.

The set of grindwheels 210 includes both a roughing grindwheel 211 that is circularly cylindrical about the grindwheel axis A6, for the purpose of roughing out the lens, and also a form grindwheel 212 adjacent to the roughing grindwheel 211, for beveling the lens.

Figure 4:
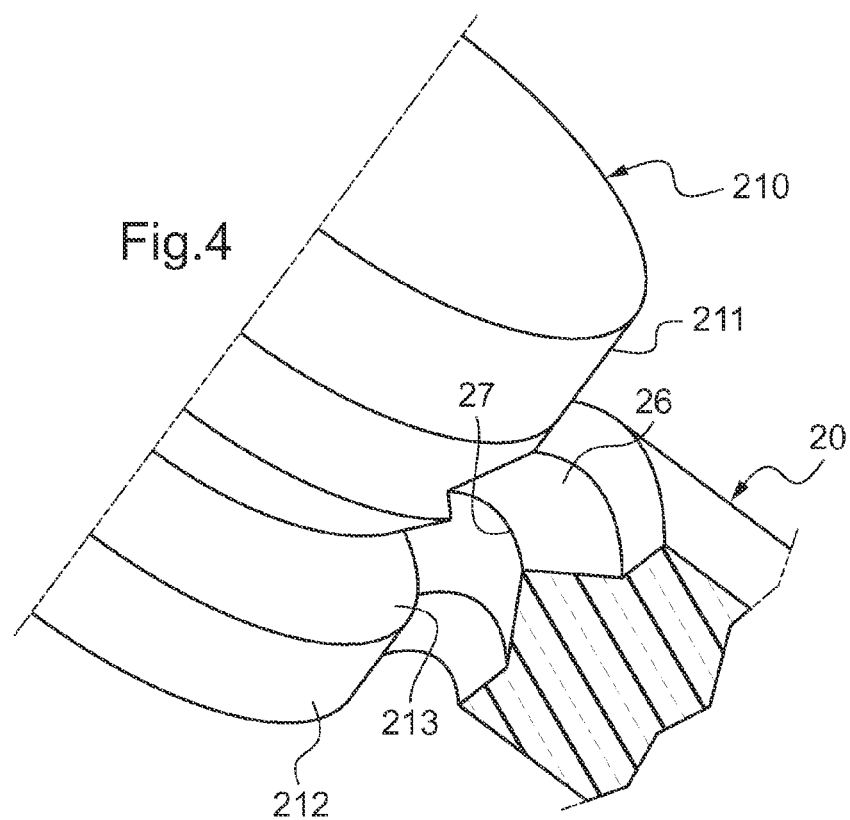
FIGS. 4 and 5 are diagrammatic perspective and elevation views showing the phenomenon whereby the engagement ridge is pared away during beveling of the FIG. 1 ophthalmic lens.
Figure 5:
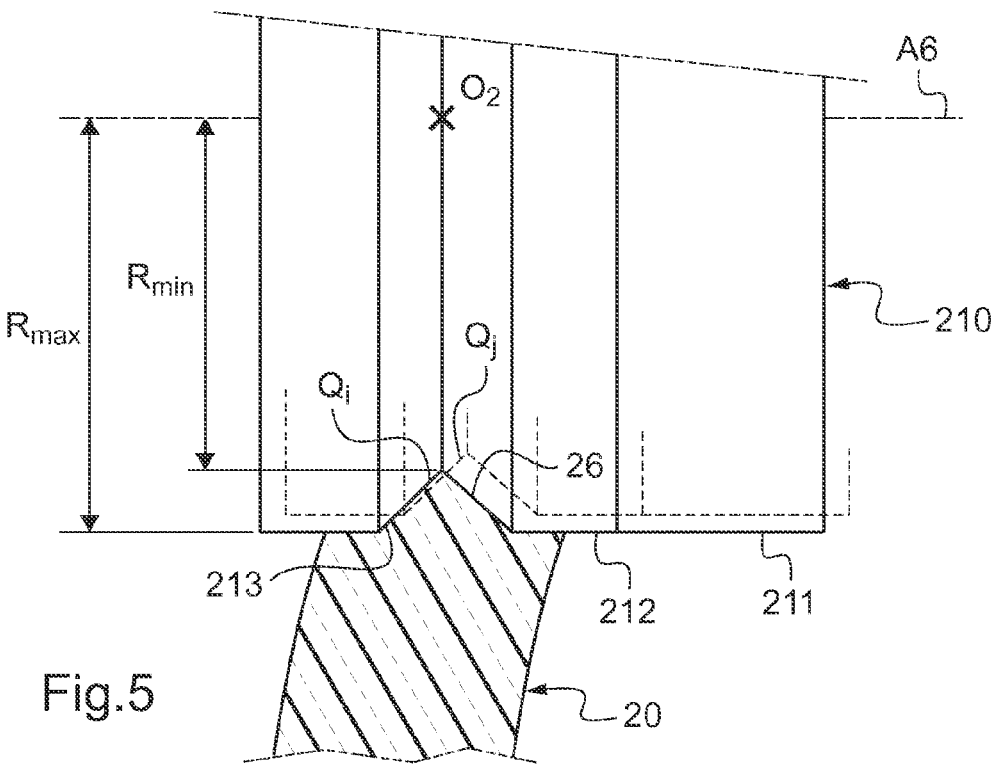

As shown in FIGS. 3 to 5, the form grindwheel, referred to as the beveling grindwheel 212, presents a working face that is generally in the form of a circular cylinder about the grindwheel axis A6, but also having a central beveling groove 213 of triangular section for forming the engagement ridge 26 on the edge face 23 of the ophthalmic lens 20.

This beveling grindwheel 212 thus presents a radius r(z) that is constant on either side of the beveling groove 213, and that varies within the beveling groove 213. This radius r(z) is equal to a maximum radius $R_{max}$ on either side of the beveling groove 213 and it is equal to a minimum radius $R_{min}$ at the bottom of the beveling groove 213 (see FIG. 5). Below it is considered that the center $O_2$ of the beveling grindwheel 212 is the point of intersection between the grindwheel axis A6 and the plane that contains the bottom edge of the beveling groove 213 in the beveling grindwheel 212.

As shown in FIG. 3, the set of grindwheels 210 is carried by a carriage (not shown) that is mounted to move in translation along the grindwheel axis A6 so as to allow the beveling grindwheel 212 to move axially relative to the edge face 23 of the ophthalmic lens 20.

The grinder 200 also includes a link 230 having one end hinged relative to the structure to pivot about the reference axis A5, and having its other end hinged relative to a nut 231 so as to pivot about an axis A8 that is parallel to the reference axis A5. The nut 231 is itself mounted to move in translation along a reproduction axis A9 that is perpendicular to the reference axis A5. As shown in FIG. 3, the nut 231 is a tapped nut in screw engagement on a threaded rod 232 that lies on the reproduction axis A9 and that is driven in rotation by a motor 233.

The link 230 also includes an abutment fitted with a contact sensor 234 that interacts with a corresponding element of the rocker 201. Under gravity, the link 230 thus controls the spacing of the blocking axis A7 of the ophthalmic lens 20 relative to the grindwheel axis A6, thus making it possible for the ophthalmic lens 20 to move transversely relative to the beveling grindwheel. More precisely, once the ophthalmic lens 20 for shaping is appropriately clamped between the two shafts 202 and 203, and is then brought into contact with one of the grindwheels 211 and 212, material is removed therefrom until the rocker 201 comes into abutment against the link 230, with bearing taking place on the contact sensor 234, which sensor thus detects abutment taking place.

In order to bevel the ophthalmic lens 20 so as to have the outline C1, it thus suffices:
- to move the set of grindwheels along the grindwheel axis A6 firstly to select the beveling grindwheel 212 by placing it in register with the edge face 23 of the ophthalmic lens 20, and secondly to keep the beveling groove 213 of the beveling grindwheel 212 constantly in a desired position relative to the edge face 23 of the ophthalmic lens 20 (e.g. half-way across the edge face 23);
- to move the nut 231 accordingly along the reproducing axis A9 so as to remove the material necessary for forming the engagement ridge 26 on the edge face 23 of the ophthalmic lens 20; and
- to cause the support shafts 202 and 203 to move together about the blocking axis A7 so as to form the engagement ridge 26 along the entire edge face 23 of the ophthalmic lens 20.

These various movements are driven in coordinated manner by a calculation and driver unit 250 suitably programmed for this purpose so that all of the points of the outline of the ophthalmic lens 20 are brought in succession to the appropriate diameter. As shown in FIG. 3, the calculation and driver unit is implemented on an office computer. Naturally, in a variant, the software portion of the grinder could be implemented directly on an electronic circuit of the grinder.

In a variant, provision could be made to use a shaper appliance of some other architecture.

In particular, in a second embodiment of the invention (not shown in the figures) it is possible to use an automatic grinder that does not have a form grindwheel. Such an automatic grinder then includes, instead of the form grindwheel, a grindwheel having two working faces such as that shown in FIG. 5 of patent document FR 2 926 896. Such a grindwheel having two working faces presents a central portion in the form of a circular cylinder about its axis of rotation, and on either side of the central portion, two truncated tapered end portions forming bodies of revolution about said axis of rotation and pointing in opposite directions. These two end portions are thus arranged to machine in succession the two flanks of the engagement ridge of the ophthalmic lens, using a method that is described in detail in the above-mentioned patent document.

The Paring-Away Phenomenon

As shown more particularly in FIGS. 4 and 5, when the blocking shafts 202 and 203 of the first embodiment of the grinder 200 pivot for the purpose of beveling the entire ridge 23 of the ophthalmic lens 20, there occurs an undesired phenomenon of the engagement ridge 26 being pared away.

As shown more precisely in FIG. 4, when the beveling grindwheel 212 is positioned to bevel a given cross-section $Q_i$ of the ophthalmic lens 20, an entire arc of its edge face is engaged in the material of the ophthalmic lens 20. Consequently, the beveling grindwheel 212 does not only machine said cross-section $Q_i$ of the lens, but it also machines the lens on either side of said cross-section $Q_i$.

As a result, and as shown in FIG. 5, when the beveling grindwheel 212 moves from a first cross-section $Q_i$ of the engagement ridge 26 of the ophthalmic lens 20 towards another cross-section $Q_j$, it does not thereby cease to machine the first cross-section $Q_i$ of the engagement ridge 26.

As shown in FIG. 6, after the beveling grindwheel has gone past, it is then found that the final shape $S_i$ of the cross-section $Q_i$ of the engagement ridge 26 does not correspond to the looked-for shape $S_{ii}$, but that on the contrary the engagement ridge 26 presents a width and a height that have been reduced, which might lead to problems of the ophthalmic lens 20 not being retained properly in the corresponding rim of the selected eyeglass frame.

The amplitude of the phenomenon of the engagement ridge 26 being pared away thus varies as a function of three factors.

The first of these factors is the curvature of the ophthalmic lens 20, also referred to as its "camber". The smaller the radius of curvature of the front optical face 21 of the ophthalmic lens 20, the greater the variations that are acquired in the axial position (along the Z axis) of the beveling grindwheel 112 in order to ensure that the beveling groove 113 of said grindwheel follows the edge face 23 of the ophthalmic lens 20, and the greater the resulting tendency of the beveling grindwheel 112 to pare undesired material away from the engagement ridge 26.

The second of these factors is the shape of the outline C1. The rounder this shape, the less the arc of the beveling grindwheel 112 is engaged in the ophthalmic lens, and thus the beveling grindwheel will have a smaller tendency to pare the engagement ridge 26 away in undesired manner. In contrast, the straighter a portion of the outline C1, the more the beveling grindwheel 112 will tend to pare the engagement ridge 26 away in undesired manner.

The third of these factors is the diameter of the beveling grindwheel 112. The greater this diameter, the more the arc of the beveling grindwheel 112 will be engaged in the ophthalmic lens, and the beveling grindwheel will therefore tend to pare-away more of the engagement ridge 26 in undesired manner.

It should also be observed that the paring-away phenomenon appears in the same manner when the ophthalmic lens is beveling using a grindwheel having two working faces as in the second embodiment of the grinder.

The Predictive Calculation Method

The present invention thus consists in a method of performing a predictive calculation of the simulated shape S of at least a portion of the engagement ridge 26, i.e. a method of calculation to predict an approximation of the shape that this portion of the engagement ridge 26 will present in the event of the grinder 200 being driven to chamfer the ophthalmic lens 20 by moving along a path setting that is deduced directly from the outline C1.

As described in greater detail below, this predictive calculation method is generally implemented herein by performing a calculation to predict the simulated shape $S_i$ of a cross-section $Q_i$ under consideration of the engagement ridge 26, and then by repeating the calculation for other cross-sections of the engagement ridge 26, and finally by deducing therefrom an approximation of the shape of the corresponding portion of the engagement ridge 26.

This predictive calculation method is made up of seven main steps.

Step No. 1

During a first step, the calculation and driver unit 250 of the grinder 200 obtains an initial path setting CONS1 that serves to generate a path as a function of which the various motors of the grinder 200 are driven so that the beveling grindwheel 212 can form the engagement ridge 26 along the edge face 23 of the ophthalmic lens 20.

This initial path setting CONS1 may be obtained in various ways.

Firstly, it may be obtained merely by searching a database registry for a record that is associated with the reference for the selected eyeglass frame and that stores the initial path setting CONS1. Nevertheless, that requires a database registry to be updated regularly.

More conventionally, the initial path setting CONS1 may be obtained by acquiring the three-dimensional shape of the bottom of the bezel of the corresponding rim of the eyeglass frame, and by calculating the initial path setting CONS1 as a function of that three-dimensional shape.

The operation of acquiring the three-dimensional shape of the bottom of the bezel may be performed by tracing the bottom of the bezel of the corresponding rim of the eyeglass frame using a conventional reader, such as that described in patent EP 0 750 172, or sold by Essilor International under the trademark Kappa or under the trademark Kappa CT.

At the end of the tracing operation, the calculation and driver unit 250 has acquired the three-dimensional coordinates of a plurality of points that characterize the shape of the outline of the bottom of the bezel. It can then determine the three-dimensional coordinates $(x_i, y_i, z_i)$ expressed in the orthonormed system $(O_1, X, Y, Z)$ for a plurality of points $P_i$ that characterize the shape of the outline C1 of the top edge 27 of the engagement ridge 26 that is to be made on the edge face 23 of the ophthalmic lens 20 (FIGS. 7 and 8).

Calculating the initial path setting CONS1 then consists in determining the position that is to be presented by the beveling grindwheel 212 relative to the ophthalmic lens 20 in order to machine the engagement ridge 26 so that its top edge 27 passes through each of the points $P_i$.

The initial path setting CONS1 is then formulated in the form of a plurality of triplets corresponding to the three-dimensional coordinates $(X_i, Y_i, Z_i)$ of the points through which the center $O_2$ of the beveling grindwheel 212 is to pass in order to machine the engagement ridge 26 so that its top edge 27 passes through each of the points $P_i$.

Given that in order to bevel the ophthalmic lens 20, the working surface of the beveling grindwheel 212 must move tangentially around the outline C1 (see FIG. 9), the three-dimensional coordinates $(X_i, Y_i, Z_i)$ of the center $O_2$ of the beveling grindwheel 212 while beveling the ophthalmic lens 20 for the point $P_i$ will be as follows:

$$X_i = x_i + R_{min} \cdot \cos(\text{Theta}_i)$$

$$Y_i = y_i + R_{min} \cdot \sin(\text{Theta}_i)$$

$$Z_i = z_i,$$

with $\text{Theta}_i$ being the angle formed between the horizontal axis A and the normal $n_i$ to the outline C1 at the point $P_i$ (see FIG. 8), and $R_{min}$ being the minimum radius of the beveling grindwheel 212 (see FIG. 5).

These triplets thus define the path to be followed by the beveling grindwheel 212 in order to bevel the ophthalmic lens, this path being expressed in the boxing rectangle, i.e. in the coordinate system of the ophthalmic lens.

Step No. 2

During a second step, the calculation and driver unit 250 determines a first approximation $S_{ii}$ of the shape of the cross-section $Q_i$ under consideration of the engagement ridge 26 (see FIG. 6).

This first approximation $S_{ii}$ is deduced from the intersection between the beveling grindwheel 212 and the ophthalmic lens 20 when the beveling grindwheel 212 is situated in a first position $\text{Pos}_i$ along its initial path setting CONS1.

In this example this first position $\text{Pos}_i$ corresponds to the position into which the beveling grindwheel 212 is driven in order to machine the engagement ridge 26 of the ophthalmic lens 20 at the point $P_i$, i.e. the position in which the grindwheel axis A6 lies in the half-plane $R_i$ of the cross-section $Q_i$ under consideration.

This first approximation $S_{ii}$ of the shape of the cross-section $Q_i$ under consideration of the engagement ridge 26 is made by determining the coordinates of a plurality of characteristic points $H_{ijk}$ of its shape. These points in this example are situated more precisely on the cross-section $Q_i$ under consideration of the edge face 23 of the ophthalmic lens 20, and they are regularly distributed along the axis Z.

Step No. 3

During a third step, the calculation and driver unit 250 determines a second approximation $S_{ij}$ of the shape of the cross-section $Q_i$ under consideration of the engagement ridge 26 (see FIG. 6).

Unlike the first approximation, this second approximation $S_{ij}$ is deduced from the intersection between the beveling grindwheel 212 and the ophthalmic lens 20 when the beveling grindwheel 212 is situated in a second position $\text{Pos}_j$ along its initial path setting CONS1.

In this example, this second position $\text{Pos}_j$ corresponds to the position into which the beveling grindwheel 212 is driven in order to machine the engagement ridge 26 of the ophthalmic lens 20 at a point $P_j$ that is distinct from and adjacent to the point $P_i$, i.e. in which the grindwheel axis A6 lies in the half-plane $R_j$ of a cross-section $Q_j$ adjacent to the cross-section $Q_i$ under consideration.

This second approximation $S_{ij}$ of the shape of the cross-section $Q_i$ under consideration of the engagement ridge 26 is obtained by determining the coordinates of a plurality of characteristic points $H_{ijk}$ of this shape. More precisely, in this example, these points are situated on the cross-section $Q_i$ under consideration of the edge face 23 of the ophthalmic lens 20 and they are regularly distributed along the Z axis.

During these second and third steps, the coordinates $(x''_i, y''_i, y''_i)$ of each of the points $H_{ijk}$ (and in particular the points $H_{iik}$ when i=j) are determined by solving a system of equations for determining the position of the line of intersection between the beveling grindwheel 212 and the ophthalmic lens 20 of outline that is initially circular.

Since the point $H_{ijk}$ under consideration is situated on the ophthalmic lens, its coordinates may be expressed in the following form:

$$x''_i(t)=x_i+t\cdot\cos(\text{Theta}_i),$$

$$y''_i(t)=y_i+t\cdot\sin(\text{Theta}_i),$$

$$z''_i=z_i+a_k.$$

The equation of the circle forming part of the working surface of the beveling grindwheel 212 and that passes through the point $H_{ijk}$ under consideration is expressed as follows:

$$(x''_i(t)-(x_j+R_{min}\cdot\cos(\text{Theta}_j)))^2+(y''_i(t)-(y_j+R_{min}\cdot\sin(\text{Theta}_j)))^2=r(z''_i)^2$$

Solving this system of equations thus amounts to solving a second degree equation of the form:

$$A\cdot t^2+B\cdot t+C=0$$

with:

$$A=1,$$

$$B=2\cdot\cos(\text{Theta}_i)\cdot(x_i-x_j-R_{min}\cdot\cos(\text{Theta}_j))+2\cdot\sin(\text{Theta}_i)\cdot(y_i-y_j-R_{min}\cdot\sin(\text{Theta}_j)),$$

$$C=x_i^2-2\cdot x_i\cdot x_j-2\cdot x_i\cdot R_{min}\cdot\cos(\text{Theta}_j))+$$

$$x_j^2+R_{min}^2\cdot\cos(\text{Theta}_j)^2+$$

$$2\cdot x_j\cdot R_{min}\cdot\sin(\text{Theta}_j)+y_i^2-2\cdot y_i\cdot y_j-$$

$$R_{min}^2\cdot\sin(\text{Theta}_j)^2+2\cdot y_j\cdot R_{min}\cdot\sin(\text{Theta}_j)-$$

$$r(z''_i)^2$$

Solving this second degree equation can then produce zero, one, or two results.

If the equation does not produce any result, that means that the beveling grindwheel 212, when situated in the second position $Pos_j$ along its initial path setting CONS1, does not interfere with the cross-section $Q_i$ under consideration of the ophthalmic lens 20.

If this equation produces one or two results (in which case only the smaller of the two results is taken into consideration), that means that the beveling grindwheel 212, when situated at the second position $Pos_j$ along its initial path setting CONS1, interferes with the cross-section $Q_i$ under consideration of the ophthalmic lens 20 at point $H_{ijk}$.

By repeating this calculation, the coordinates $(x''_i, y''_i, z''_i)$ of each of the points $H_{ijk}$ under consideration are thus obtained.

The calculation and driver unit 250 then deduces therefrom the second approximation $S_{ij}$ of the shape of the engagement ridge 26 at the cross-section $Q_i$ under consideration.

Step No. 4

In order to obtain a good estimate of the shape of the engagement ridge 26 at the cross-section $Q_i$ under consideration after the ophthalmic lens has been completely beveled, it is preferable to repeat this approximation calculation at other cross-section $Q_j$ adjacent to the cross-section $Q_i$ under consideration.

Consequently, during a fourth step, the calculation and driver unit 250 proceeds in the same manner as in the third step to determine other approximations $S_{ij}$ of the shape of the cross-section $Q_i$ under consideration of the engagement ridge 26.

Figure 9:
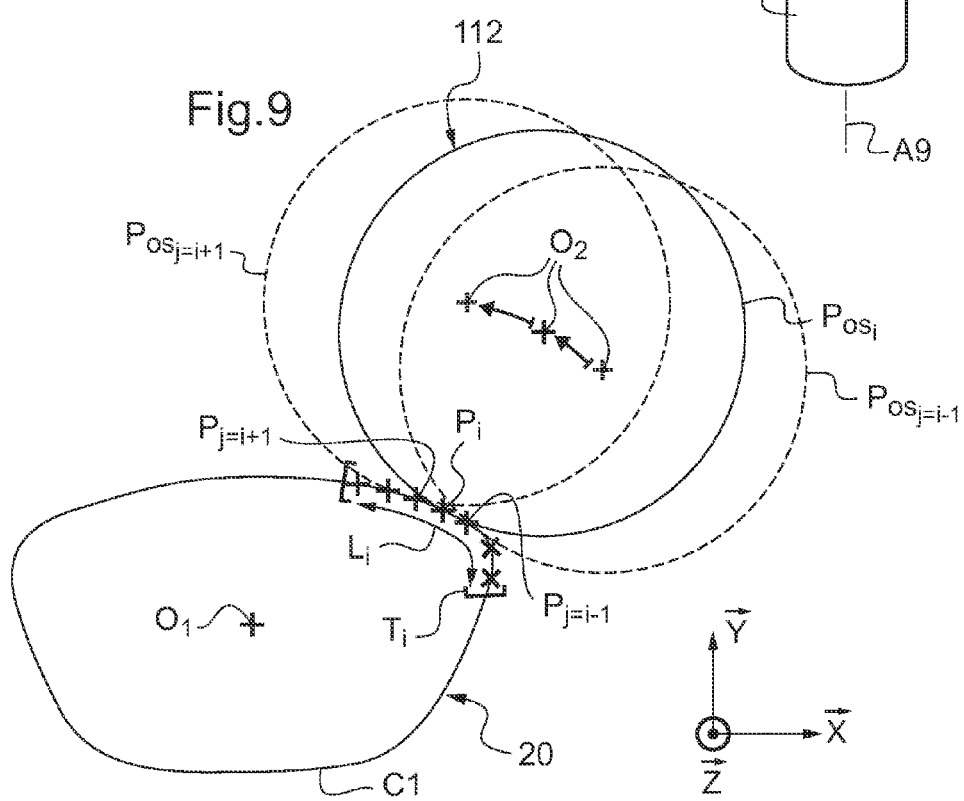
FIG. 9 is a diagrammatic plan view showing the movement of the beveling grindwheel around the edge face of the ophthalmic lens for forming the engagement ridge.

As shown in FIG. 9, these second and other cross-sections $Q_j$ adjacent of the cross-section $Q_i$ under consideration are not selected randomly, but on the contrary they are regularly distributed on either side of the cross-section $Q_i$ under consideration, within a simulation fraction $T_i$ of the outline C1 that is centered on the point $P_i$ of the cross-section $Q_i$ under consideration and that presents a determined simulation length $L_i$.

The simulation length $L_i$ may be determined, and it may be selected to be less than 20 millimeters along a curvilinear abscissa, e.g. it may be equal to 15 millimeters.

In a variant, provision may also be made to determine this simulation length $L_i$ as a function of the radius of the shaper grindwheel 212 and of the curvature of the outline C1 at the point $P_i$. In particular, provision may be made to lengthen the simulation length $L_i$ when the radius of curvature of the outline C1 at the point $P_i$ is greater than a constant that is deduced from the radius of the shaper grindwheel 212, and to shorten the simulation length $L_i$ when the radius of curvature of the outline C1 at the point $P_i$ is shorter than another constant, likewise deduced from the radius of the shaper grindwheel 212.

Step No. 5

During a fifth step, the calculation and driver unit 250 determines the intersection of said approximation $S_{ii}$, $S_{ij}$ of the shape of the cross-section $Q_i$ under consideration of the engagement ridge 26 in such a manner as to deduce therefrom the simulated shape $S_i$ of said cross-section $Q_i$ under consideration of the engagement ridge 26.

This intersection is calculated by determining, for each constant k that is used, which is the point $H_{ijk}$, $H_{ihk}$ that is the closest to the boxing center C1.

As shown in FIG. 6 for the first and second approximations $S_{ii}$ and $S_{ij}$, this produces the simulated shape $S_i$ of the cross-section $Q_i$ under consideration of the engagement ridge 26.

Step No. 6

During a sixth step, the calculation and driver unit 250 repeats the calculation described in steps 2 to 5 in order to determine the simulated shapes $S_j$ of other cross-sections $Q_j$ under consideration of the engagement ridge 26, situated in the segments of interest T1, T2.

The cross-sections $Q_j$ under consideration within a given segment of interest T1, T2 are preferably selected in such a manner as to be spaced apart in pairs at a spacing along a curvilinear abscissa along the outline C1 that lies in the range 2 millimeters to 20 millimeters.

Thereafter, using an interpolation calculation, the calculation and driver unit 250 uses the simulated shapes $S_i$, $S_j$ for the various cross-sections $Q_i$, $Q_j$ under consideration of the engagement ridge 26 to construct a three-dimensional model representative of the simulated shape S of each section of interest T1, T2 of the engagement ridge 26.

This three-dimensional model, which is thus calculated even before beginning to shape the ophthalmic lens 20 with the grinder 200, may then be used in various ways for optimizing the shaping of the ophthalmic lens in order to ensure that the ophthalmic lens is retained better in the rim of the selected eyeglass frame.

Step No. 7a

A first use of this model, which applies more particularly to the first embodiment of the grinder shown in FIG. 3, consists in correcting the initial path setting CONS1 for the beveling grindwheel 212 as a function of this three-dimensional model in such a manner as to obtain a corrected path setting CONS2 that makes it possible to compensate for the reduction in the height of the engagement ridge 26 as a result of it being pared away in undesired manner.

In order to obtain the corrected path setting CONS2, the calculation and driver unit 250 acts at each cross-section $Q_i$ under consideration to calculate the difference $E_i$ (see FIG. 6) between the height of the three-dimensional mode of the engagement ridge 26 and the looked-for height for said ridge (which corresponds to the depth of the beveling groove). Thereafter, as a function of this difference $E_i$, it corrects the initial path setting CONS1.

By way of example, if the calculation and driver unit 250 finds a given difference $E_i$ at a given cross-section $Q_i$ of the engagement ridge 26, it may correct the initial path setting CONS1 in such a manner that the ophthalmic lens is beveled in this given cross-section $Q_i$ along an outline C2 that is spaced apart from the outline C1 by a radial distance lying in the range half to all of the difference $E_i$.

By then driving the movement of the beveling grindwheel 212 relative to the ophthalmic lens 20 along said corrected path setting CONS2, an ophthalmic lens is thus obtained having its engagement ridge that enables the lens to be better retained in the rim of the selected eyeglass frame.

In a variant, in order to obtain the corrected path setting CONS2, the calculation and driver unit 250 could proceed in some other way, for example by:
  acquiring a three-dimensional geometrical model of the bezel of the rim of the selected eyeglass frame; and then by
  calculating, in each cross-section $Q_i$ of the engagement ridge 26, an increase for its radius about the central axis Z of the ophthalmic lens 20 that is to be applied to the simulated shape S of the engagement ridge 26 so that said stimulated shape S as corrected in this way is substantially tangential to the bezel of the eyeglass frame, and finally by
  correcting, as a function of said increase in diameter, the initial path setting CONS1.

Step No. 7b

A second use of the three-dimensional model of the segments of interest of the engagement ridge, which applies more particularly to the second embodiment of the grinder, consists in correcting the initial path setting of the grindwheel having two working faces in such a manner as to obtain a corrected path setting that makes it possible to compensate for the deformation of the section of the engagement ridge that results from it being pared away in undesired manner.

In order to obtain the corrected path setting, the calculation and driver unit calculates at each cross-section under consideration, firstly the difference between the height of the three-dimensional model of the engagement ridge and the looked-for height for said ridge, and secondly the difference between the width of the three-dimensional model of the engagement ridge and the looked-for width for said ridge. Thereafter it corrects the initial path setting as a function of those two differences.

By way of example, we consider circumstances in which the calculation and driver unit finds a height error and a width error in a given cross-section of the engagement ridge. It then corrects the initial path setting in such a manner that each flank of the engagement ridge of the ophthalmic lens is beveled in said given cross-section to follow an outline that is offset from the initially-intended outline by a radial distance equal to the observed height difference and an axial distance equal to half the observed width difference.

Step No. 7c

A third possible use of the three-dimensional model of the segments of interest T1, T2 of the engagement ridge 26 consists more simply in refusing or in accepting beveling of the ophthalmic lens 20 with the beveling grindwheel 212 at its initial path setting CONS1, depending on whether it is estimated that the paring-away phenomenon does or does not run the risk of harming the retention of the lens in its rim.

For this purpose, the calculation and driver unit 250 proceeds by:
  calculating, for at least one cross-section $Q_i$ of the engagement ridge 26, and preferably for each cross-section under consideration, a difference or a ratio between the area of the first approximation $S_{ii}$ of the shape of the cross-section $Q_i$ under consideration of the engagement ridge 26 and the area of the simulated shape $S_i$ of the cross-section $Q_i$ under consideration; and then by
  comparing said difference or ratio with a threshold value; and finally by
  refusing or accepting to bevel the ophthalmic lens as a function of the result of the comparison.

As an illustration, provision may be made to determine the ratio between those areas at each cross-section $Q_i$ under consideration, to calculate a mean of said ratio over the set of cross-sections under consideration, and then to accept beveling if said mean value is greater than 50% or to refuse beveling if it is less than 50%.

Thus, if the beveling is accepted, the beveling grindwheel 212 is driven to follow the initial path setting CONS1 so as to finish shaping the ophthalmic lens 20.

In contrast, if beveling is refused, the calculation and driver unit 250 suspends the operations of machining the ophthalmic lens 20.

It may then proceed in various ways.

For example, if the grinder 200 has a second beveling tool of diameter smaller than the diameter of the beveling grindwheel 212, it may drive the beveling of the ophthalmic lens 20 by using this second tool.

In a variant, it may do no more than display an error message informing the optician that the lens cannot be shaped using the grinder 200. When confronted with such an error message, the optician may either order a new ophthalmic lens presenting less camber, so that the lens is less sensitive to paring-away of its engagement ridge, or else may use another grinder 200 that is suitable for shaping the ophthalmic lens.

For this purpose, one such other grinder may have a beveling grindwheel of smaller diameter or a beveling grindwheel presenting an additional degree of freedom in movement enabling it to be inclined so as to follow the curvature of the edge face 23 of the ophthalmic lens 20.

The present invention is not limited in any way to the embodiments described and shown, and the person skilled in the art knows how to apply any variant in accordance with its spirit.

In particular, provision may be made to form the predictive calculation on a single given cross-section of the engagement ridge, e.g. the cross-section that is the most likely to be pared away, and then to refuse or accept beveling of the lens depending on whether said given cross-section of the engagement ridge presents a shape that is close to or remote from the initially-desired shape. In order to implement this variant, the first step may indeed consist in acquiring not the entire initial path setting CONS1, but only a portion of said setpath.

In another variant, the above-described calculations may be performed on a portion only of the outline C1, so as reduce the time needed to perform the calculations.

More precisely, and as explained above, the magnitude of the phenomenon of paring away the engagement ridge 26 varies as a function of the rectilinear or rounded shape of the outline C1.

With the outline C1 shown in FIG. 7, the risks of the engagement ridge 26 being pared away are thus smaller in the four rounded corners U1-U4, but in contrast they are greater in the two rectilinear zones T1 and T2.

In order to limit the amount of time needed for the calculation to predict the simulated shape S of the engagement ridge 26, it is then possible to make do with performing the calculation only in the segments T1 and T2 of the outline C1 that are of interest, i.e. segments where paring away runs the risk of giving rise to poor retention of the ophthalmic lens in the corresponding rim of the selected eyeglass frame.

For this purpose, between the first and second steps, provision may be made to select said segments of interest T1, T2 on the basis of three criteria, namely: the radius of curvature of the outline C1, the camber, and the diameter of the beveling grindwheel 212. These segments are then also selected so as to be spaced apart in pairs by a curvilinear abscissa length of more than 20 millimeters.

The invention claimed is:

1. A predictive calculation method for calculating a simulated shape ($S_i$) of at least a portion of at least one cross-section ($Q_i$) under consideration of an engagement ridge (26) that is to be arranged on the edge face (23) of an ophthalmic lens (20) and that is to result from beveling the edge face (23) of said ophthalmic lens (20) by means of a beveling grindwheel (212) rotating about an axis of rotation (A6), with movement thereof relative to the ophthalmic lens (20) being driven in application of an initial path setting (CONS1), the method comprising the following steps:
   a) obtaining at least a portion of said initial path setting (CONS1) making it possible to form at least a fraction of said engagement ridge (26);
   b) determining a first approximation ($S_{ii}$) of the shape of at least a portion of said cross-section ($Q_i$) under consideration of the engagement ridge (26), the approximation being deduced from the intersection between the beveling grindwheel (212) and the ophthalmic lens (20) when the beveling grindwheel (212) is situated in a first position ($Pos_i$) of its initial path setting (CONS1);
   c) determining a second approximation ($S_{ij}$) of the shape of at least a portion of said cross-section ($Q_i$) under consideration of the engagement ridge (26), the approximation being deduced from the intersection between the beveling grindwheel (212) and the ophthalmic lens (20) when the beveling grindwheel (212) is situated at a second position ($Pos_j$) of its initial path setting (CONS1), distinct from its first position ($Pos_i$);
   d) determining the intersection between first and second approximations ($S_{ii}$, $S_{ij}$) of the shape of said cross-section ($Q_i$) under consideration of the engagement ridge (26); and
   e) deducing from the intersection determined in step d), the simulated shape ($S_i$) of said cross-section ($Q_i$) under consideration of the engagement ridge (26).

2. A method according to claim 1, wherein said first position ($Pos_i$) of the beveling grindwheel (212) corresponds to the position in which its axis of rotation (A6) extends in the plane ($R_i$) of said cross-section ($Q_i$) under consideration.

3. A method according to claim 2, including additional steps consisting in determining additional approximations ($S_{ij}$) of the shape of said cross-section ($Q_i$) under consideration of the engagement ridge (26), said approximations being deduced from the intersection between the beveling grindwheel (212) and the ophthalmic lens (20) when the beveling grindwheel (212) is situated in other positions ($Pos_j$) of its initial path setting (CONS1) that are distinct from said first and second positions ($Pos_i$, $Pos_j$), and in step d), in determining the intersections between all of the various approximations ($S_{ii}$, $S_{ij}$) of the shape of said cross-section ($Q_i$) under consideration of the engagement ridge (26).

4. A method according to claim 3, wherein the additional approximations ($S_{ij}$) of the shape of said cross-section ($Q_i$) under consideration of the engagement ridge (26) are made for positions of the beveling grindwheel (212) that are situated exclusively on the initial path setting (CONS1) on either side of the first position ($Pos_i$) within a simulation portion ($T_i$) presenting a determined simulation length ($L_i$).

5. A method according to claim 4, wherein the simulation length ($L_i$) is less than 20 millimeters along a curvilinear abscissa.

6. A predictive calculation method for calculating a simulated shape (S) of at least a portion of an engagement ridge (26) to be arranged on the edge face (23) of an ophthalmic lens (20), the method comprising a plurality of repetitions of the predictive calculation method according to claim 1 for calculating simulated shapes ($S_i$) of various cross-sections ($Q_i$) under consideration of said at least one portion of the engagement ridge (26).

7. A method according to claim 6, wherein said first positions ($Pos_i$) of the beveling grindwheel (212) associated with the various cross-sections ($Q_i$) under consideration are grouped together exclusively on predetermined segments of interest (T1, T2) of the initial path setting (CONS1).

8. A method according to claim 7, wherein the segments of interest (T1, T2) are those on which the initial path setting (CONS1) of the beveling grindwheel (212) satisfies a relationship that is a function of the radius of curvature of the initial path setting (CONS1) and of the diameter of the beveling grindwheel (212).

9. A method according to claim 7, wherein the segments of interest (T1, T2) are spaced apart in pairs along a curvilinear abscissa by a length that is greater than 20 millimeters.

10. A method of beveling an ophthalmic lens (20) for arranging an engagement ridge (23) on the edge face (26) of said ophthalmic lens (20), the method comprising:
   proceeding with the predictive calculation of the simulated shape (S) of at least a portion of the engagement ridge (26) in accordance with the method according to claim 6;
   correcting said initial path setting (CONS1) for the beveling grindwheel (212) as a function of the simulated shape (S) of the engagement ridge (26) so as to obtain a corrected path setting (CONS2); and
   driving the movement of the axis (A6) of the beveling grindwheel (212) relative to the ophthalmic lens (20) while following said corrected path setting (CONS2).

11. A beveling method according to claim 10, comprising, in order to obtain the corrected path setting (CONS2):
   comparing the simulated shape (S) of the engagement ridge (26) with the initial path setting (CONS1); and
   as a function of the result of said comparison, correcting the initial path setting (CONS1).

12. A beveling method according to claim 10, comprising, in order to obtain the corrected path setting (CONS2):

acquiring a geometric model of a bezel of an eyeglass frame in which the ophthalmic lens (20) is to be mounted after beveling;

for at least one cross-section ($Q_i$) of the engagement ridge (26), calculating a diameter increase about an axis of the ophthalmic lens (20) for application to the simulated shape (S) of the engagement ridge (26) so that said simulated shape (S) as corrected in this way is substantially tangential to the bezel of the eyeglass frame; and as a function of said diameter increase, correcting the initial path setting (CONS1).

13. A method of beveling an ophthalmic lens (20) to arrange an engagement ridge (26) on the edge face (23) of said ophthalmic lens (20), the method comprising:

performing the predictive calculation of the simulated shape (S) of at least a portion of the engagement ridge (26) in accordance with the method according to claim 6; and refusing or accepting beveling of the ophthalmic lens (20) with the beveling grindwheel (212) and its initial path setting (CONS1) as a function of the simulated shape (S) of the engagement ridge (26).

14. A beveling method according to claim 13, comprising, for at least one cross-section ($Q_i$) of the engagement ridge (26):

determining a difference or a ratio between the area of the first approximation ($S_{ii}$) of the shape of the cross-section under consideration and the area of the simulated shape ($S_i$) of the cross-section ($S_i$) under consideration;

comparing said difference or said ratio with a threshold value; and refusing or accepting beveling of the ophthalmic lens (20) with the beveling grindwheel (212) and its initial path setting (CONS1) as a function of the result of said comparison.

15. A beveling method according to claim 13, comprising, after refusing beveling using the beveling grindwheel (212) and its initial path setting (CONS1), proceeding with beveling of the ophthalmic lens (20) with another tool of smaller diameter or with another machining appliance providing the beveling grindwheel (212) with at least one additional degree of freedom in movement.

16. A method according to claim 1, including additional steps consisting in determining additional approximations ($S_{ij}$) of the shape of said cross-section ($Q_i$) under consideration of the engagement ridge (26), said approximations being deduced from the intersection between the beveling grindwheel (212) and the ophthalmic lens (20) when the beveling grindwheel (212) is situated in other positions ($Pos_j$) of its initial path setting (CONS1) that are distinct from said first and second positions ($Pos_i$, $Pos_j$), and in step d), in determining the intersections between all of the various approximations ($S_{ii}$, $S_{ij}$) of the shape of said cross-section ($Q_i$) under consideration of the engagement ridge (26).

17. A method according to claim 8, wherein the segments of interest (T1, T2) are spaced apart in pairs along a curvilinear abscissa by a length that is greater than 20 millimeters.

* * * * *

UNITED STATES PATENT AND TRADEMARK OFFICE
CERTIFICATE OF CORRECTION

PATENT NO. : 8,845,390 B2  
APPLICATION NO. : 13/162253  
DATED : September 30, 2014  
INVENTOR(S) : Frédéric Dubois et al.

It is certified that error appears in the above-identified patent and that said Letters Patent is hereby corrected as shown below:

In the Specification,

Column 11, lines 16-36 to read as follows:

-- Solving this system of equations thus amounts to solving a second degree equation of the form:

$$A.t^2 + B.t + C = 0$$

with:

$A = 1$, $B = 2.\cos(Theta_i).(x_i - x_j - R_{min}.\cos(Theta_j)) + 2.\sin(Theta_i).(y_i - y_j - R_{min}.\sin(Theta_j))$, $C = x_i^2 - 2.x_i.x_j - 2.x_i.R_{min}.\cos(Theta_j) + x_j^2 + R_{min}^2.\cos(Theta_j)^2 + 2.x_j.R_{min}.\cos(Theta_j) + y_i^2 - 2.y_i.y_j - 2.y_i.R_{min}.\sin(Theta_j) + y_j^2 + R_{min}^2.\sin(Theta_j)^2 + 2.y_j.R_{min}.\sin(Theta_j) - r(z''_i)^2$ Solving this second degree equation can then produce zero, one, or two results. --

Column 12, lines 32-34 to read as follows:

-- This intersection is calculated by determining, for each constant k that is used, which is the point $H_{iik}$, $H_{ihk}$ that is the closest to the boxing center C1. --

Signed and Sealed this  
Third Day of March, 2015

Michelle K. Lee  
*Deputy Director of the United States Patent and Trademark Office*